United States Patent
Zimmermann et al.

(10) Patent No.: US 6,546,796 B2
(45) Date of Patent: Apr. 15, 2003

(54) LIQUID LEVEL SENSOR

(75) Inventors: Bernd Zimmermann, Ashland, OH (US); David W. Reynolds, Galion, OH (US); Richard E. Welch, Lexington, OH (US); Hank E. Millet, Piqua, OH (US)

(73) Assignee: Therm-O-Disc, Incorporated, Mansfield, OH (US)

( * ) Notice: Subject to any disclaimer, the term of this patent is extended or adjusted under 35 U.S.C. 154(b) by 0 days.

(21) Appl. No.: 09/809,480

(22) Filed: Mar. 15, 2001

(65) Prior Publication Data

US 2002/0129650 A1 Sep. 19, 2002

(51) Int. Cl.[7] .......................... G01F 23/27; G01F 23/00
(52) U.S. Cl. ...................... 73/295; 73/290 R; 73/304 R
(58) Field of Search ..................... 73/290 R, 304 R, 73/308, 295

(56) References Cited

U.S. PATENT DOCUMENTS

| | | | |
|---|---|---|---|
| 2,279,043 A | 4/1942 | Harrington | 73/295 |
| 3,279,252 A | 10/1966 | Barlow | 73/295 |
| 4,032,363 A | * 6/1977 | Raag | 136/211 |
| 4,423,629 A | 1/1984 | Ara et al | 73/295 |
| 4,771,271 A | 9/1988 | Zanini-Fisher | 340/620 |
| 4,969,749 A | 11/1990 | Hasselmann | 374/115 |
| 5,022,263 A | 6/1991 | Uriu et al. | 73/295 |
| 5,103,368 A | 4/1992 | Hart | 361/284 |
| 5,201,223 A | 4/1993 | McQueen | 73/295 |
| 5,553,494 A | 9/1996 | Richards | 73/304 R |
| 5,730,026 A | 3/1998 | Maatuk | 73/295 |
| 5,831,159 A | 11/1998 | Renger | 73/204.24 |
| 5,908,985 A | * 6/1999 | Maatuk | 73/295 |
| 6,024,487 A | 2/2000 | Gillen et al. | 374/121 |

FOREIGN PATENT DOCUMENTS

| | | |
|---|---|---|
| DE | 20 35 154 | 1/1971 |
| DE | 37 36 208 | 5/1989 |
| DE | 38 02 225 | 7/1989 |
| DE | 40 30 401 | 9/1991 |
| EP | 0248504 | 6/1987 |
| EP | 0340309 | 10/1987 |
| GB | 7462 | 3/1914 |
| JP | 55 44923 | 9/1978 |
| JP | 56 6116 | 6/1979 |
| JP | 38 17 895 | 1/1989 |
| JP | 57158522 | 9/1989 |
| JP | 5 281167 | 3/1992 |
| WO | WO 9100452 | 3/1991 |

* cited by examiner

*Primary Examiner*—Daniel S. Larkin
*Assistant Examiner*—Rodney Frank
(74) *Attorney, Agent, or Firm*—Harness, Dickey & Pierce, P.L.C.

(57) ABSTRACT

An improved liquid level sensor is disclosed which provides a reliable and simple device for accurately determining the level of a liquid within a vessel. The sensor of the present invention utilizes a plurality of thermocouples grouped in pairs with the pairs being spaced along a line extending generally in the direction in which the liquid level may vary. A first thermocouple of each pair is located in relatively close thermal proximity to an electrically powered heater and the second of each pair of thermocouples is spaced away from the heater. The thermocouples are connected in series and produce a signal directly indicative of the level of the liquid along the sensor. Additionally, a pressure sensing circuit may also be incorporated with the liquid level sensor.

33 Claims, 4 Drawing Sheets

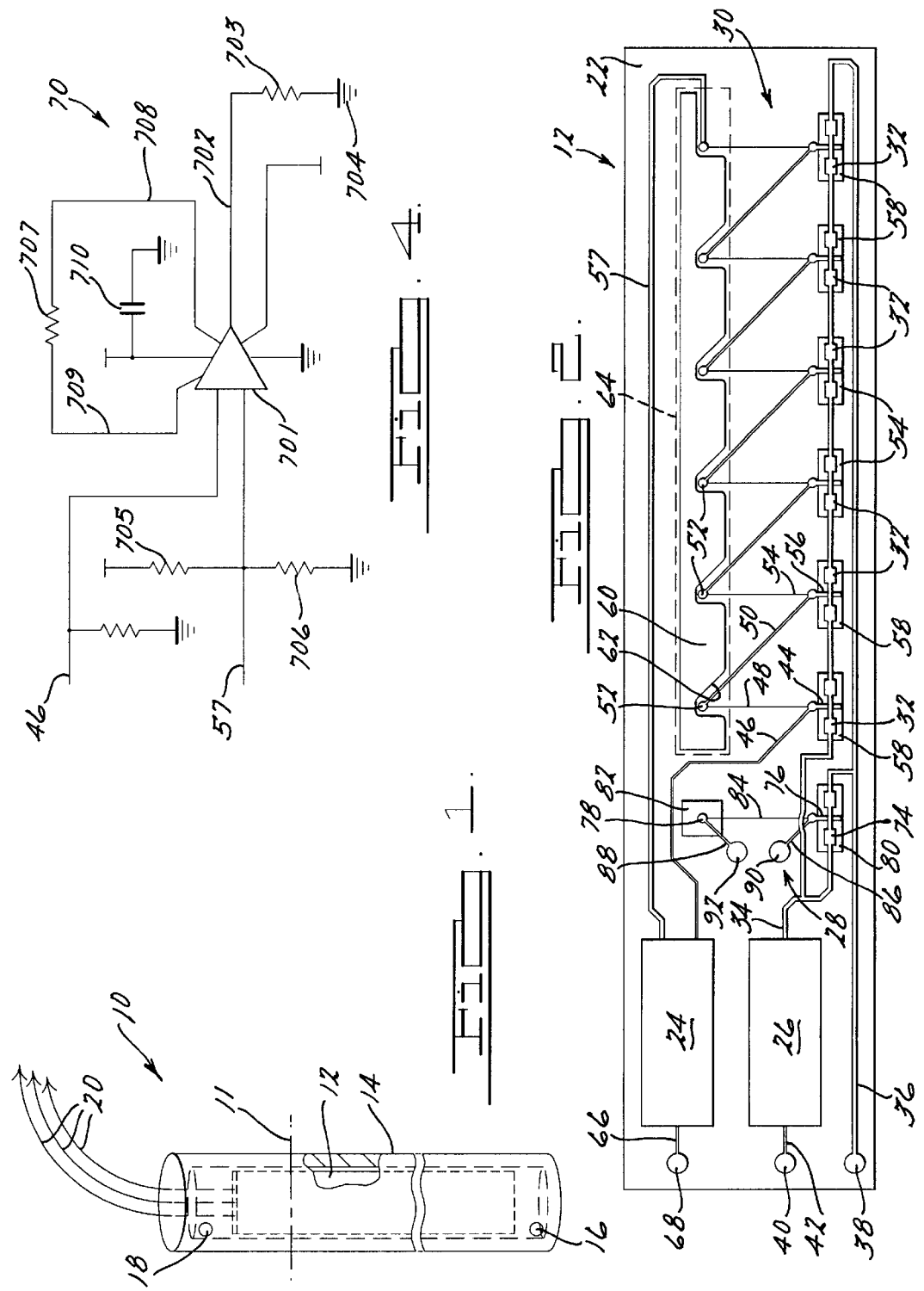

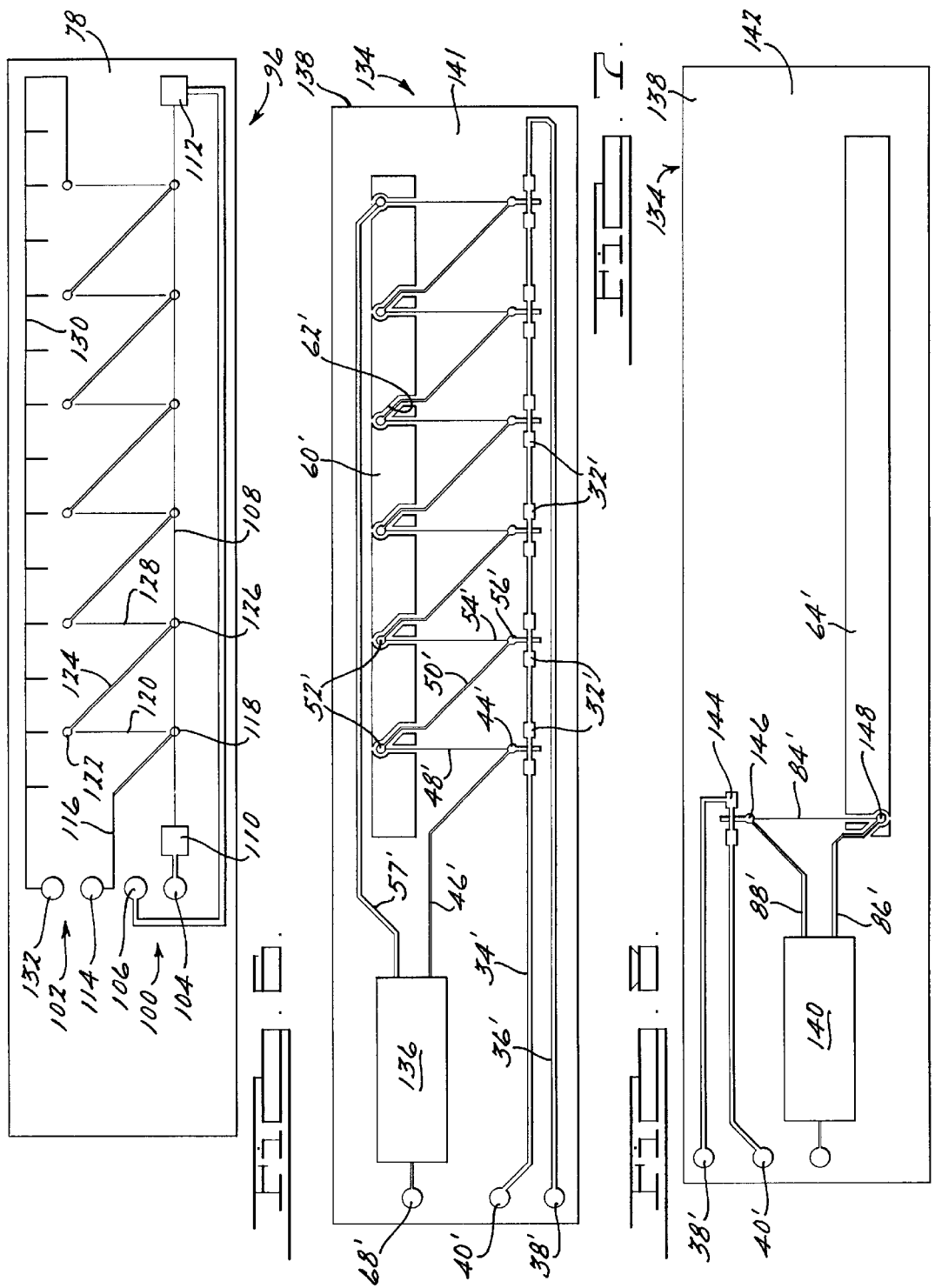

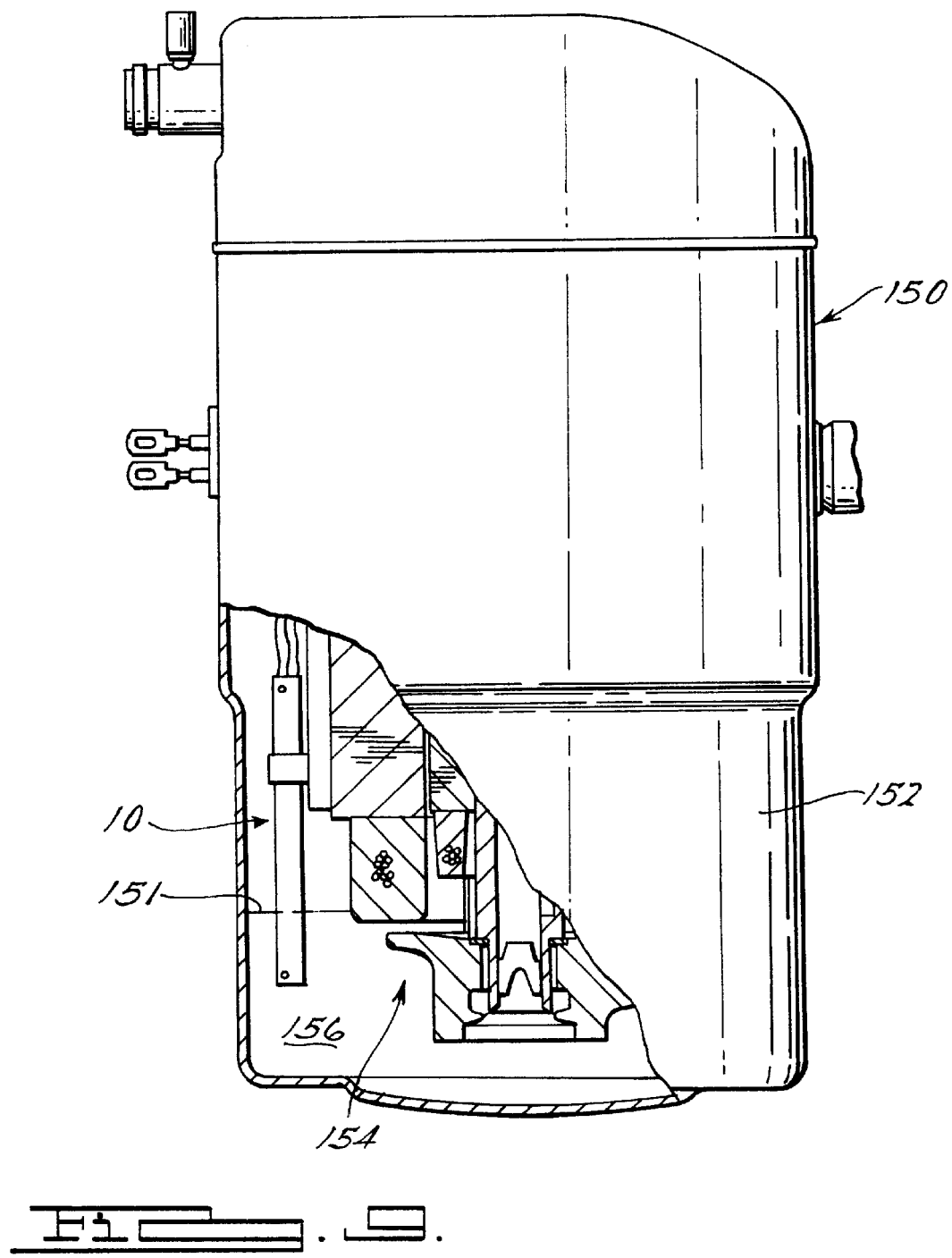

LIQUID LEVEL SENSOR

BACKGROUND AND SUMMARY OF THE INVENTION

The present invention relates generally to devices used to measure the level of a liquid within a vessel or container and more specifically to such a device which employs a plurality of serially connected thermocouples arranged in laterally spaced pairs with respective thermocouples of each pair being positioned in substantially parallel spaced rows.

There exists a wide variety of applications in which it is desirable to monitor to some degree the level of a liquid within a vessel or the like. Such applications may range from monitoring various fluid levels within a motor vehicle or internal combustion engine or fuel tank to monitoring oil levels within a pump or compressor or even water levels within a tank such as for a recreational vehicle or boat. In each of these applications it is desirable that the liquid level sensor be capable of providing a reliable accurate indication of the liquid level over an extended period of time without requiring periodic maintenance. In many applications the level sensor must be capable of enduring various levels of vibration, heat or other hostile environmental elements as well as space limitations. Additionally, in some applications utilizing sealed vessels such as hermetic compressors, it is desirable to minimize the number of penetrations such as electrical leads through the walls of the vessel to reduce the potential for leakage.

Various types of devices have been developed over the years for sensing such levels of liquids. Such devices range from the extremely simple float arrangement commonly employed in fuel tanks to more complex electrical capacitance type sensors as well as microprocessor based thermocouple sensors. While operable, these various types of sensors have had varying drawbacks depending upon the particular application such as excessive space requirements for accommodating moveable floats and associated linkage, relatively high costs to manufacture, complexity of circuitry required to generate a level indicating signal, susceptibility to errors from extended or extraneous electrical noise, lack of resistance to hostile environmental elements, etc.

The present invention overcomes these drawbacks inherent in the prior art sensors by providing an extremely reliable sensor which is compact and simple in design and can be manufactured at very low costs. Further the present invention can be encapsulated or coated with a variety of suitable materials to enable it to maintain prolonged operation in numerous different and potentially hostile environments. The sensor of the present invention incorporates a first plurality of thermocouples arranged along a substrate with a suitable heater arranged in close proximity thereto. In order to compensate for ambient temperature, a second compensating thermocouple is associated with each of the first thermocouples and laterally spaced therefrom. The thermocouples are interconnected in series with respective first and second thermocouples alternating in the serial interconnection. The first ones of the thermocouples provide an indication of the rate of heat dissipation which is directly related to the nature of the fluid surrounding the thermocouple while the second thermocouples provide a compensation factor dependent upon the ambient temperature. This arrangement not only provides a very simple and reliable device for measurement of liquid levels within a container but further minimizes the number of leads that must extend through the wall of the container which may be important particularly if the liquid to be measured is part of a closed system such as for example a refrigeration system.

Additional advantages and features of the present invention will become apparent from the subsequent description and the appended claims taken in conjunction with the accompanying drawings.

BRIEF DESCRIPTION OF THE DRAWINGS

FIG. 1 is diagrammatical view of a liquid level sensor positioned within an enclosure which is adapted to be supported within a vessel all in accordance with the present invention;

FIG. 2 is a plan view of the sensor of the present invention shown with a signal amplifier and power supply incorporated therein;

FIG. 4 is a circuit diagram for an exemplary liquid level signal conditioning circuit to be incorporated into the sensor of the present invention;

FIG. 6 is a plan view similar to that of FIG. 2 but showing another embodiment of the sensor in accordance with the present invention;

FIG. 7 is a view similar to that of FIG. 2 but showing a presently preferred embodiment of the present invention;

FIG. 8 is a view of the backside of the embodiment of FIG. 7; and

FIG. 9 is a view of a compressor with the liquid level sensor of the present invention installed therein.

DESCRIPTION OF THE PREFERRED EMBODIMENTS

Figure 3:
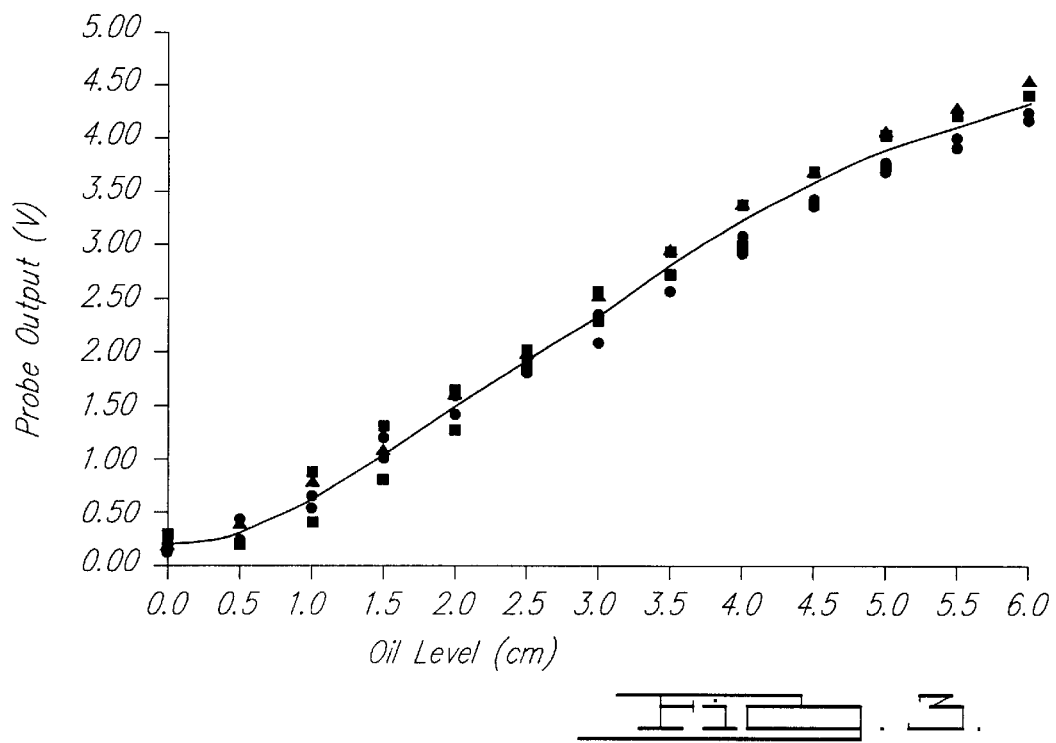
FIG. 3 is a graphical representation showing the voltage output as a function of oil level for a group of five different test sensors of the present invention.

Referring now to the drawings and in particular to FIG. 1, there is shown a liquid level sensor 10 in accordance with the present invention. Liquid level sensor 10 comprises a printed circuitboard 12 disposed within a hollow generally cylindrically shaped container 14. Preferably container 14 will be closed at least at the lower end thereof and will have one or more holes 16, 18 opening into the interior adjacent each end thereof. Holes 16 enable liquid 11 to flow into or out of the interior of container 14 whereas holes 18 allow gases to flow into and out of container 14. As shown, a plurality of leads 20 extend outwardly from circuitboard 12 through the upper end of container 14. Container 14 serves to dampen the changes in liquid level which may occur as a result of movement of the vessel within which the liquid 11 is contained and/or agitation of the liquid 11 resulting from movement of apparatus within the liquid containing vessels. The specific number of holes 16 and 18 at each end as well as the size thereof may be varied depending on the viscosity of the liquid 11 whose level is to be sensed as well as the degree of anticipated agitation of the liquid 11 and desired responsiveness of the sensor. That is to say, increasing the number and/or size of the holes will enable the sensor to respond more rapidly to changes in liquid level but may result in a greater number of errors due to transient changes in the liquid level resulting from agitation of the liquid. Similarly, fewer and/or smaller holes will result in reduced sensitivity to agitation of the liquid 11 but may increase the time required to sense a sudden drop in the liquid level. It should be noted that container 14 may be open at one or both ends in lieu of or in addition to providing holes 16 and 18 or alternatively holes 16 and 18 may be replaced by one or more slots. Container 14 may be fabricated from any material suitable for the environment within which it may be utilized including for example polymeric compositions or various metals. Alternatively, container 14 may be integrally formed with a portion of the vessel within which the liquid 11 is contained or as part of other apparatus disposed within the vessel. It should also be noted that container 14 may in some applications be in the form of a suitably shaped shield sufficient to protect circuitboard 12 from splashing of the liquid 11 which could result in erroneous level readings or if splashing is not of concern, the shield or container may be eliminated in its entirety.

Referring now to FIG. 2, printed circuitboard 12 is shown and includes a relatively rigid elongated substrate 22 upon which signal conditioning circuitry 24, a power supply circuitry 26, a pressure sensing thermocouple assembly 28, and a liquid level sensing assembly 30 are supported. Substrate 22 may be fabricated from a variety of different materials but will preferably be made from a suitable printed circuitboard material having good electrical insulating capabilities and preferably resistant to degradation from the environment in which it will be utilized. It is also preferable that the material be relatively thin to promote heat transfer from one surface to the other and to promote faster response time.

The liquid level sensing assembly 30 includes a plurality of substantially identical heating resistors 32 positioned in spaced relationship extending along one side of the substrate 22 and interconnected in series relationship. Power is supplied to one end of the string of heating resistors 32 from power supply circuitry 26 via lead 34 and a ground lead 36 extends along the edge of substrate 22 to contact 38 at one end of substrate 22. A second contact 40 is provided adjacent contact 38 and includes lead 42 extending to power supply circuitry 26 for supplying power to printed circuitboard 12. A first hot thermocouple 44 is provided comprising the juncture between copper lead 46 and constantine lead 48. Constantine lead 48 extends laterally of substrate 22 to a point where it is joined to a second copper lead 50 to thereby form a second cold thermocouple 52. Copper lead 50 in turn extends diagonally across substrate 22 to a point which is positioned generally longitudinally aligned with but longitudinally spaced from first thermocouple 44. Copper lead 50 is then joined to another constantine lead 54 to form a second hot thermocouple 56. This alternating interconnection of copper leads and constantine leads is repeated to thus provide a first longitudinally extending array of spaced hot thermocouples arranged generally in longitudinally aligned relationship extending adjacent one edge of the substrate 22 and a second longitudinally extending array of spaced cold thermocouples also arranged generally in longitudinally aligned relationship adjacent the opposed edge of substrate 22. A return lead 57 extends from the rightmost (as shown) thermocouple along the upper edge of substrate 22 to signal conditioning circuitry 24.

In order to promote heat transfer to the respective hot thermocouples 44, 56, a copper pad 58 may be positioned in underlying relationship to each of the heating resistors 32. Preferably each resistor will have its own discrete pad so as to minimize heat transfer between longitudinally adjacent thermocouples. Preferably, thermocouples 44, 56 will be positioned between respective copper pads 58 and respective heating resistors 32 and will be electrically insulated therefrom although copper pads 58 could be located on the opposite side of substrate 22 from thermocouples 44, 56 and heating resistors 32 if desired. An elongated copper heat sink strip 60 is also provided in close proximity to cold thermocouples 52. As shown, heat sink strip 60 includes a plurality of cutout portions 62 along the length thereof to accommodate and space it from the respective cold thermocouples and associated leads while still positioning the heat sink in partial surrounding relationship thereto. Additionally, if desired or as an alternative to heat sink 60, an additional elongated copper heat sink 64 may be provided on the opposite surface of substrate 22 from that on which heat sink 60 and thermocouples 52 are provided. Heat sinks 60 and 64 operate to minimize the effect of any heating of cold thermocouples 52 that may result from heating resistors 58 thereby ensuring that cold thermocouples will provide an accurate compensation factor correlated to the ambient temperature.

It should also be noted that the relative lateral positioning of the respective hot and cold thermocouples should be along a line extending parallel to the surface of the liquid to be measured so as to ensure that both hot and cold thermocouples of a given pair are both located above or below the liquid level surface at any given time. The lateral spacing between the respective pairs of hot and cold thermocouples 44, 52 should be sufficient to minimize heating of the cold thermocouples 52 by the resistors 58 associated with the hot thermocouples 44. The longitudinal spacing of the respective pairs of hot and cold thermocouples 44, 52 may be varied as desired to provide varying degrees of precision in the liquid level detection however they should be spaced sufficiently so as to minimize the heat transfer between longitudinally adjacent thermocouples. Any number of pairs of hot and cold thermocouples may be incorporated in printed circuitboard 12 and the length thereof will be selected so as to ensure a sufficient number and spacing of thermocouples to cover the desired range of liquid level to be sensed as well as the degree of level resolution desired.

In operation, each hot thermocouple 44, 56 will generate a potential, the magnitude of which will be dependent upon its temperature. Assuming a sensor such as is shown in FIG. 2 having a series of six hot thermocouples 44, 56, the total voltage generated when the probe is not immersed in liquid will be six times the potential generated by a single hot thermocouple 44. However, if one of the hot thermocouples is immersed in a liquid, the greater thermal transfer efficiency afforded by liquids as opposed to gaseous fluids will result in reduced heating of the immersed thermocouple by the heating resistor 58 and hence a lower potential being generated thereby. As the hot thermocouples 44, 56 are interconnected in series, the potential generated by each thermocouple will be additive with the resulting signal being indicative of the temperatures of the thermocouples and hence their presence in a gas or liquid environment.

However, the amount of heat radiated by each of the hot thermocouples 44, 56 and hence the potential they may generate is also influenced by ambient temperatures. Thus it is necessary to provide a cold thermocouple 52 for each hot thermocouple. As noted above, the orientation between the copper and constantine leads for each cold thermocouple 52 is reversed from that of each of the hot thermocouples 44, 56. This results in each of the cold thermocouples 52 generating a potential of opposite polarity to that of the associated hot thermocouple 44. Thus because the cold thermocouples 52 are connected in series with the hot thermocouples 44, 56, this opposite polarity potential will subtract from the potential generated by the hot thermocouples 44, 56. The value of the cold thermocouples 52 potential will be less than the potential produced by the hot thermocouples 44, 56 because the heating resistor maintains the hot thermocouple at a temperature above ambient. Thus, as may be appreciated, the summation of potentials produced by the hot and cold thermocouple will produce a resulting potential which is indicative of the level to which sensor 12 is immersed in the liquid which signal is corrected to accommodate variances in ambient temperatures.

As mentioned previously, the resulting signal produced by the thermocouples 44, 52, 56 is supplied to signal conditioning circuitry 24. Signal conditioning circuitry 24 may include amplification circuitry to amplify the thermocouple output signal as well as suitable filters to reduce electrical noise or the like. In any event, the resulting signal is outputted from signal conditioning circuitry 24 via lead 66 to contact 68. From contact 68 the resulting signal indicative of the fluid level may be supplied to suitable remote indicating means for monitoring of the liquid level as sensed by printed circuitboard 12.

FIG. 3 shows the results of testing of five sample sensors of the present invention to determine the oil level in a hermetic compressor. As shown for these particular samples a relatively consistent and accurate signal was provided which indicated the oil level over a relative wide range of up to about 6 centimeters. As can be seen from this graph, the signal generated by the thermocouples represents an almost linear relationship to changes in oil level. If desired, the resulting signal can be further linearized by varying the values of the individual heating resistors rather than utilizing substantially identical values therefor. Additionally, the degree of resolution may be varied by selection of the spacing of the resistors and thermocouples.

While the use of serially connected thermocouples provides an output signal providing both a high degree of resolution as well as an excellent signal to noise ratio, it is typically in the range of 1–4 mV. As noted above, It is therefore generally desirable to amplify this output signal and a suitable amplifier circuit is shown in FIG. 4 at 70 to accomplish this. As shown therein, an instrumentation amplifier 701 is provided which includes an output supplied via lead 702 to a load resistor 703 which is connected to ground 704. Terminal 68 of FIG. 2 provides an output signal equal to the voltage drop across resistor 703. The signal from hot and cold thermocouples 44, 56, 52 is supplied to amplifier 701 via leads 46 and 57. A common mode voltage is established at lead 57 by a voltage divider circuit including resistors 705 and 706. A resistor 707 is connected across leads 708, 709 of amplifier 701 and establishes the gain which will typically be in the range of 500–1000 mV/mV. A capacitor 710 is also connected to amplifier 701 and provides power supply decoupling for the circuit 24. It is contemplated that this or another suitable amplifier circuit will be incorporated into printed circuitboard 12 as part of signal conditioning circuitry 24.

Additionally, in order to ensure accurate and consistent liquid level readings it is important that the voltage applied to the resistor string and hence current flow therethrough be closely regulated (preferably +/−1%). This may easily be done by providing suitable power supply regulating circuitry 26 on circuitboard 12 if desired or alternatively a remote regulated source of power may be supplied to circuitboard 12 if desired.

It should be noted that both the amplification circuit as well as the regulated power supply 26 circuit may be easily integrated into the sensor itself being provided at one end of substrate 22 as shown in FIG. 2, additionally any further signal conditioning circuitry desired for a particular application may also be incorporated into substrate 22 or alternatively this and any such additional circuitry desired may be located remotely from the sensor.

Liquid level sensor 12 is specifically adapted for use in sensing the oil level within a hermetic compressor. In such an application, the sensor may be subjected to wide variations in pressure which may impair correlation of the output signal with the liquid level. The reason for this is that a given gas at a higher pressure will generally conduct heat away from the thermocouples at a faster rate than the same gas at a lower pressure. Thus in some applications it may be desirable to provide a signal indicative of the ambient pressure within the liquid container. This may be accomplished by incorporating an additional heater resistor 74 in parallel with heater resistors 58, and an additional hot thermocouple 76 in good heat transfer relationship therewith but electrically insulated therefrom. Additionally, in order to compensate for varying ambient temperatures, an additional cold thermocouple 78 is provided being laterally spaced from hot thermocouple 76. Preferably, a copper pad 80 similar to copper pads 58 will be positioned below heating resistor 74 and a copper heat sink 82 will be positioned below thermocouple 78. As before, copper pad 80 and heat sink 82 will be in good thermal transfer with resistor 74 and thermocouples 76 and 72 but will be electrically insulated therefrom. The operation of respective copper pad 80 and heat sink 82 will be substantially the same as described above with reference to pads 58 and heat sinks 60 and 64. As before, a constantine lead 84 is provided between thermocouples 76 and 78 and copper leads 86 and 88 extend outwardly to respective contacts 90, 92.

Figure 5:
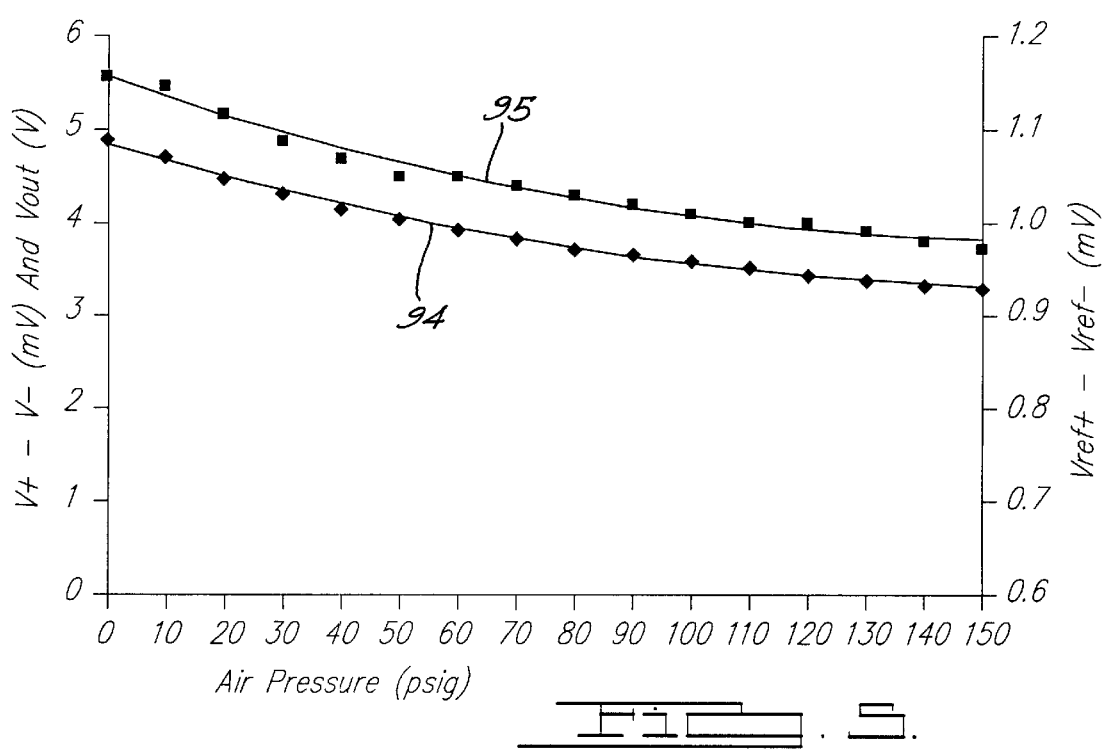
FIG. 5 is a graph illustrating the variation of output voltage as a function of pressure.

Hot and cold thermocouples 76 and 78 will operate in a similar manner as described above. More specifically, resistor 80 will transfer heat to hot thermocouple 76 which will generate a potential indicative of its temperature. The heating of thermocouple 76 by resistor 80 will be offset by heat radiated or otherwise transferred to the surrounding gaseous environment. The rate at which heat is transferred to the surrounding gas will be dependent upon the pressure of the gas. That is, a greater amount of heat will be transferred when the surrounding gas is at higher pressure and thus the potential generated by hot thermocouple 76 will decrease as pressure increases. This is shown graphically in FIG. 5 wherein line 94 indicates the output voltage across terminals 90 and 92 provided on sensor 12 at varying air pressure. Also as mentioned above, cold thermocouple 78 will provide a potential of opposite polarity indicative of ambient temperature thereby reducing the net voltage output across terminals 90 and 92 to compensate for changes in ambient temperature. The graph of FIG. 5 represents a worst case scenario in which all of the level indicating thermocouples are exposed to the gaseous environment (i.e., the liquid level is below the lowest pair of thermocouples). Under these conditions, the liquid level signal represented by line 95 will closely track the signal from pressure indicating circuit. As increasing numbers of thermocouple pairs are immersed in liquid, the effect of pressure variances will decrease and hence line 95 will approach a straight horizontally extending line.

Thus, as may be apparent, the sensor of the subject invention may also provide an output signal from terminals 90, 92 to a remote location which signal is indicative of the ambient pressure within the liquid vessel and may be used for a variety of purposes including providing an overpressure alarm or to generate a correction factor for the liquid level indicating signal. If desired for a particular application, the signal from terminals 90 and 92 may be supplied to suitable signal conditioning circuitry similar to the signal from thermocouples 44, 56 and 52 which circuitry may include an amplification circuit such as that described above with reference to FIG. 4. Such amplification circuitry and/or signal conditioning circuitry may be incorporated onto circuitboard 12 or may be located at a remote location. It should be noted that hot and cold thermocouples 76 and 78 should be positioned on substrate 22 at a locator that will maintain them above the maximum anticipated liquid level. Of course in applications where pressure variances are not of concern, these thermocouples and the associated circuitry may be omitted.

Preferably, printed circuitboard 12 will be coated or encapsulated with a suitable coating such as for example a silicone or epoxy coating to afford protection from the liquid and other environmental elements as well as to avoid potential shorting. Such coatings must have good heat transfer characteristics but yet must also provide sufficient electrical insulation to the components. Additionally, it is highly desirable that the coating be able to clearly shed the liquid the level of which is to be sensed so as to minimize the potential for erroneous readings resulting from clinging drops of the liquid.

It should also be noted that preferably thermocouples 44, 56, and 76 will be positioned between respective copper pads 58, 80 and heating resistors 32 and 74 so as to promote heat transfer thereto. A suitable relatively thin electrical insulating film will be provided between these thermocouples, the underlying copper pads and overlying resistors, however such suitable film should have good heat transfer characteristics. Additionally, heating resistors 32, 74 are preferably in the form of separate assemblies secured to substrate 22 but could alternatively be screen printed on substrate 22 in which case thermocouples 44, 56, 76 would be positioned in overlying but electrically insulated relationship thereto. Further, while as described above, it is contemplated that heating resistors 32 will be substantially identical and equally spaced, this is not mandatory. The value of the individual resistors may alternatively be varied to produce a more linear relationship than that shown by the graph of FIG. 3 and/or the spacing therebetween may be varied to produce a greater degree of resolution over a particular portion of the level range if desired.

It should also be noted that while the sensor shown in FIG. 2 is designed to have the right hand end immersed in liquid with the leads extending away from the upper end thereof, this arrangement may be reversed so that the power supply and signal conducting leads extend outwardly from the lower portion thereof although it would be necessary to reposition the pressure sensing circuit to maintain it above the liquid level. Such an arrangement may be desirable to avoid the leads acting as wicks to direct liquid down across the printed circuitboard 12. The sensor of the present invention may be suitably supported within an integrally formed or separately formed container such as described above or alternatively it may be openingly supported in the desired liquid containing vessel if desired for a given application.

In some applications, it may be desirable to locate only the sensor itself within the liquid container and position both the power supply and signal conditioning portions at a remote location. Accordingly, another embodiment of the present invention is shown in FIG. 6 being indicated generally at 96. Sensor 96 includes an elongated substrate 98 upon which is mounted a heater circuit 100 and a thermocouple circuit 102.

Heater circuit 100 includes a pair of input terminals 104, 106 to which a suitable power source may be connected, it being understood that the power source will be capable of providing a closely regulated supply of power as noted above. In this embodiment, the individual heating resistors are replaced by a suitable resistance heating wire 108 extending between contacts 110 and 112. Copper and other like highly conductive material is used to extend leads between contacts 110 and 112 and the associated terminals 104 and 106.

The thermocouple circuit 102 comprises a first terminal 114 from which a copper lead 116 extends to a first hot thermocouple 118. A constantine lead 120 extends from the first hot thermocouple 118 laterally across substrate 98 to a first cold thermocouple 122. Another copper lead 124 then extends diagonally across the width of substrate 98 to a second hot thermocouple 126 from which a constantine lead 128 extends laterally across substrate 98. As described above with reference to printed circuitboard 12, this pattern repeats itself any desired number of times to provide the desired number of serially connected pairs of thermocouples spaced along substrate 98. A copper lead 130 then extends from the lowermost thermocouple longitudinally along substrate 98 to a second terminal 132 positioned adjacent terminal 114 to complete the circuit. Suitable leads may then be connected to terminals 114 and 132 to conduct the resulting signal to a remote location. If desired a suitable heat sink may be provided on one or both sides of substrate 98 positioned in good thermal relationship to but electrically insulated from the row of cold thermocouples as described above. Additionally, copper pads may be positioned below heater wire 118 at the point at which the hot thermocouples overlie same if desired. Additionally, a suitable electrically insulating thermally conductive material will be positioned between the hot thermocouples 118, 126 and heater wire 108 to prevent shorting therebetween. Heater wire 108 may also be screen printed thereon. Alternatively, discrete heating resistors may be used in place of heater wire 108. A pressure sensing circuit as described above may also be provided on substrate 98 if desired.

The operation of sensor 98 will be substantially identical to that described above with respect to printed circuitboard 12. Further, the various optional features and modifications described above may also be equally applicable to sensor 96.

Referring now to FIGS. 7 and 8, a preferred embodiment of the present invention is illustrated being indicated at 134. Circuitboard or sensor 134 is similar to that of circuitboard 12 with the following exceptions. First signal conditioning circuitry 136 for conditioning and/or amplifying the signal from the liquid level sensing thermocouples is located on one side 141 of substrate 138 and a second signal conditioning circuit 140 for conditioning and/or amplifying the signal from the pressure sensing thermocouples is located on the opposite surface 142 of substrate 138. Additionally, heating resistor 144, hot thermocouple 146 and cold thermocouple 148 forming the pressure sensing circuit are also located on side 142 of substrate 138. Further, the copper pads 58 and 80 associated with respective heating resistors 32 and 74 are not included in this embodiment. Lastly, circuitboard 134 does not incorporate an integral regulated power supply but rather is provided with power from a remotely located regulated power supply. The remaining portions of circuitboard 134 are substantially identical to the corresponding portions of circuitboard 12 and accordingly corresponding portions thereof have been indicated by the same reference numbers primed. The operation of circuitboard 134 will in all other respects be substantially identical to that described with reference to circuitboard 12 above and the various options and modifications discussed above may be incorporated into sensor 134.

As shown in FIG. 9, sensor 10, which may include any one of the above referenced circuitboards, is well suited for use in a hermetic compressor 150. Compressor 150 includes an outer shell 152 within which is disposed a motor compressor assembly 154 and an oil sump 156 in the lower portion of shell 152 for supplying oil 151 to lubricate the motor compressor assembly 154. Sensor 10 is secured to motor compressor assembly 154 in a position so as to be particularly immersed in the oil 151 contained in sump 156 and thus will operate to provide a signal indicative of the oil level within sump 156. It should be noted that if desired, sensor 10 may be connected to suitable remotely located apparatus to sound an alarm, deenergize the compressor or both in response to an indication that the oil level within shell 152 has dropped below a predetermined minimum. Additionally, sensor 10 may also be utilized to indicate a liquid level above a predetermined maximum and perform similar or the same functions as above.

As may now be appreciated, the liquid level sensor of the present invention provides a relatively simple and reliable means for determining the level of a liquid in virtually any vessel. The level sensor of the present invention is designed to provide continuous monitoring of the level as the heater circuit and sensing circuits are independent of each other. The sensor is well suited for economical manufacturing and requires only a very limited space to accommodate it. Further, the sensor may offer a wide degree of resolution of the level being sensed and may even accommodate increased resolution over a specific portion of the level range being sensed.

While it will be appreciated that the preferred embodiments of the invention disclosed are well calculated to provide the advantages and features above stated, it will be appreciated that the invention is susceptible to modification, variation and change without departing from the proper scope or fair meaning of the subjoined claims.

We claim:

1. A liquid level sensor comprising:
   a substrate having a longitudinal axis;
   a first plurality of thermocouples provided on one side of said substrate in longitudinally spaced relationship;
   a second plurality of thermocouples provided on said one side of said substrate in longitudinally spaced relationship to each other, respective ones of said second plurality of thermocouples being positioned in laterally spaced relationship to respective ones of said first plurality of thermocouples;
   said first and second thermocouples being interconnected in alternating series relationship;
   a heat source for increasing the temperature of each of said first plurality of thermocouples,
   a heat sink positioned in heat transfer relationship to said plurality of second thermocouples,
   said sensor being adapted to be positioned within a vessel containing a volume of liquid with said substrate partially immersed in said liquid such that said first and second plurality of thermocouples will cooperate to generate a signal indicative of the level of liquid within said vessel.

2. A liquid level sensor as set forth in claim 1 wherein said second plurality of thermocouples are operative to generate a compensating signal indicative of ambient temperature.

3. A liquid level sensor as set forth in claim 2 wherein said first plurality of thermocouples generates a signal of a first polarity and said second plurality of thermocouples generate a signal of opposite polarity.

4. A liquid level sensor as set forth in claim 1 wherein said heat source comprises a plurality of spaced heaters.

5. A liquid level sensor as set forth in claim 4 wherein said heaters comprise discrete resistors.

6. A liquid level sensor as set forth in claim 1 wherein said sensor includes third and fourth serially connected thermocouples operative to generate a signal indicative of a pressure within said vessel.

7. A liquid level sensor as set forth in claim 6 further comprising a heat source positioned in heating relationship to said third thermocouple.

8. A liquid level sensor as set forth in claim 1 further comprising a regulated power source for supplying power to said heat source.

9. A liquid level sensor as set forth in claim 8 wherein said power source is provided on said substrate.

10. A liquid level sensor as set forth in claim 1 wherein said signal from said thermocouples is supplied to signal conditioning circuitry.

11. A liquid level sensor as set forth in claim 10 wherein said signal conditioning circuitry includes an amplifier.

12. A liquid level sensor as set forth in claim 10 wherein said signal conditioning circuitry is provided on said substrate.

13. A liquid level sensor as set forth in claim 1 further comprising a shield for resisting splashing of a liquid onto said sensor.

14. A liquid level sensor as set forth in claim 12 wherein said shield comprises a container, said substrate being supported within said container and said container being supported within said vessel in a position whereby said substrate is partially immersed in said liquid.

15. A liquid level sensor as set forth in claim 14 wherein said container includes openings adjacent opposite ends thereof whereby said liquid may flow into and out of said container.

16. A liquid level sensor as set forth in claim 1 wherein said corresponding ones of said pairs of said first and second plurality of thermocouples are positioned along a line extending generally parallel to the surface of said liquid.

17. A liquid level sensor comprising:
    a substrate having a longitudinal axis;
    a first plurality of thermocouples provided on one side of said substrate in longitudinally spaced relationship;
    a second plurality of thermocouples provided on said one side of said substrate in longitudinally spaced relationship to each other, respective ones of said second plurality of thermocouples being positioned in laterally spaced relationship to respective ones of said first plurality of thermocouples,
    said first and second thermocouples being interconnected in alternating series relationship;
    a heat source for increasing the temperature of each of said plurality of first thermocouples; and
    a heat sink provided on said substrate in close proximity to said second plurality of thermocouples;
    said sensor being adapted to be positioned within a vessel containing a volume of liquid with said sensor partially immersed in said liquid such that said first and second thermocouples cooperate to generate a signal indicative of the level of said liquid within said vessel.

18. A liquid level sensor as set forth in claim 17 wherein each of said first plurality of thermocouples generate a first magnitude signal when positioned at a level above the surface of said liquid and a second magnitude signal when positioned at a level below said surface of said liquid, the sum of said first and second magnitude signals being indicative of the level of said liquid within said vessel.

19. A liquid level sensor as set forth in claim 18 wherein said second plurality of thermocouples generate a signal indicative of the ambient temperature within said vessel.

20. A liquid level sensor as set forth in claim 19 wherein said first magnitude signal is greater than said second magnitude signal.

21. A liquid level sensor as set forth in claim 17 wherein said heat sink is provided on said substrate on a side of said substrate that is opposite said one side of said substrate.

22. A liquid level sensor as set forth in claim 17 further comprising a thermally conductive electrically insulating coating encapsulating said sensor.

23. A liquid level sensor as set forth in claim 22 wherein said coating is operative to shed droplets of said liquid.

24. A liquid level sensor as set forth in claim 17 wherein said heat source comprises an elongated resistance heater.

25. A liquid level sensor for use in determining the level of a liquid along the length thereof comprising:
   an elongated substrate;
   a first plurality of thermocouples provided on said substrate in longitudinally spaced relationship;
   a second plurality of thermocouples provided on said substrate in longitudinally spaced relationship, respective ones of said second plurality of thermocouples being laterally spaced from respective ones of said first plurality of thermocouples,
   said first and second thermocouples being interconnected in alternating series relationship;
   a plurality of heating elements, respective ones of said plurality of heating elements being positioned in close proximity to respective ones of said plurality of first thermocouples;
   said plurality of first and plurality of second thermocouples cooperating to generate a signal indicative of the level of liquid along the length of said substrate when said substrate is at least partially immersed in said liquid.

26. A liquid level sensor as set forth in claim 25 wherein said sensor is adapted to be positioned within said vessel with the longitudinal axis of said substrate extending in the direction along which said liquid level changes.

27. A liquid level sensor as set forth in claim 25 further comprising a shield, said shield being operative to dampen agitation of said liquid in an area surrounding said substrate to thereby minimize erroneous liquid level errors.

28. A liquid level sensor as set forth in claim 25 wherein said first plurality of thermocouples are arranged in a longitudinally extending row, the length of said row being equal to or greater than the desired range of liquid levels to be measured.

29. A liquid level sensor as set forth in claim 25 wherein selected ones of said heating elements is positioned in thermally conductive electrically insulated relationship to each of said first plurality of thermocouples.

30. A liquid level sensor as set forth in claim 25 wherein said sensor includes third and fourth serially connected thermocouples operative to generate a signal indicative of a pressure within said vessel.

31. A liquid level sensor as set forth in claim 25 further comprising a heat source positioned in heating relationship to said third thermocouple.

32. A liquid level sensor for use in providing a signal indicative of the level to which said sensor is submersed in a liquid comprising:
   an elongated substrate having an upper end and a lower end;
   a first series of thermocouples positioned in spaced relationship along the length of said substrate;
   a second series of thermocouples positioned in spaced relationship along the length of said substrate, each of said second series of thermocouples being laterally spaced from a corresponding one of said first series of thermocouples;
   said first and second series of thermocouples being interconnected in alternating series relationship;
   a first electrical lead extending from adjacent said lower end of said substrate to one of said first series of thermocouples located most closely adjacent said upper end of said substrate and a second electrical lead ending from adjacent said lower end of said substrate to one of said second series of thermocouples located most closely adjacent the lower end of said substrate; and
   a heat source comprising a plurality of heating elements for heating each of said first series of thermocouples, said heat source having electrical connections located adjacent said lower end of said substrate,
   said first and second series of thermocouples cooperating to provide a signal indicative of the level to which said substrate is submersed in said liquid;
   power supply leads connected to said electrical connections on said substrate to supply power to said heat source and signal transmitting leads electrically connected to said first and second electrical leads to transmit said signal to a remote indicator, said power supply leads and said signal transmitting leads extending away from said substrate so as to thereby avoid transferring liquid to a portion of said substrate above the level at which it is submersed.

33. A liquid level sensor for use in providing a signal indicative of the level to which said sensor is submersed in a liquid comprising:
   an elongated substrate;
   a first plurality of thermocouples provided on said substrate in longitudinally spaced relationship;
   a second plurality of thermocouples provided on said substrate in longitudinally spaced relationship to each other, respective ones of said second plurality of thermocouples being positioned in laterally spaced relationship to respective ones of said first plurality of thermocouples,
   said first and second thermocouples being interconnected in alternating series relationship;
   a heat source for increasing the temperature of each of said first plurality of thermocouples comprising a plurality of discrete heating elements, respective ones of said plurality of heating elements being positioned in close proximity to respective ones of said plurality of first thermocouples;
   a coating overlying said first and second plurality of thermocouples and said heat source, said coating being operative to resist retention of liquid above said level to which said sensor is submersed in said liquid,
   said first and second plurality of thermocouples cooperating to provide an accurate signal indicative of the level to which said sensor is submersed in said liquid.

* * * * *